United States Patent
Grisenthwaite et al.

(10) Patent No.: US 7,401,210 B2
(45) Date of Patent: Jul. 15, 2008

(54) SELECTING SUBROUTINE RETURN MECHANISMS

(75) Inventors: Richard Roy Grisenthwaite, Guilden Morden (GB); Paul Kimelman, Alamo, CA (US); David James Seal, Cambridge (GB)

(73) Assignee: Arm Limited, Cambridge (GB)

( * ) Notice: Subject to any disclaimer, the term of this patent is extended or adjusted under 35 U.S.C. 154(b) by 214 days.

(21) Appl. No.: 11/092,984

(22) Filed: Mar. 30, 2005

(65) Prior Publication Data

US 2006/0224866 A1    Oct. 5, 2006

(51) Int. Cl.
*G06F 9/00* (2006.01)
(52) U.S. Cl. .................................... 712/242
(58) Field of Classification Search ............ 712/242, 712/226
See application file for complete search history.

(56) References Cited

U.S. PATENT DOCUMENTS

| | | | |
|---|---|---|---|
| 4,429,361 A | | 1/1984 | Maccianti et al. |
| 5,261,101 A | * | 11/1993 | Fenwick ............. 712/202 |
| 5,535,397 A | | 7/1996 | Durante et al. |
| 5,889,982 A | * | 3/1999 | Rodgers et al. ......... 712/229 |
| 5,968,169 A | | 10/1999 | Pickett |
| 6,408,385 B1 | | 6/2002 | Matsuo et al. |
| 6,898,698 B1 | | 5/2005 | Sunayama et al. |
| 2003/0097549 A1 | | 5/2003 | Ukai et al. |
| 2005/0154868 A1 | * | 7/2005 | Rabe et al. ............ 712/242 |

FOREIGN PATENT DOCUMENTS

DE    102 52 347    5/2004
EP    0 742 513    11/1996

OTHER PUBLICATIONS

J. Losq, "Subroutine Return Stack" *IBM Technical Disclosure Bulletin*, vol. 24, No. 7A, Dec. 1981, pp. 3255-3258.

* cited by examiner

*Primary Examiner*—Tonia L. M. Dollinger
*Assistant Examiner*—Benjamin Geib
(74) *Attorney, Agent, or Firm*—Nixon & Vanderhye P.C.

(57) ABSTRACT

Following execution of a subroutine, a return instruction is executed having an address as an input operand thereto. This input operand is compared with one or more predetermined values to detect a match and the return instruction response is selected in dependence upon whether or not a match is detected. Thus, the return address value can be used to invoke differing return instruction responses, such as an exception return response or a procedure return response. The one or more predetermined addresses may be conveniently allocated to the highest memory addresses within the memory map.

19 Claims, 3 Drawing Sheets

SELECTING SUBROUTINE RETURN MECHANISMS

BACKGROUND OF THE INVENTION

1. Field of the Invention

This invention relates to the field of data processing systems. More particularly, this invention relates to the control of which subroutine return mechanism is to be used when returning from a subroutine.

2. Description of the Prior Art

It is known to provide data processing systems supporting subroutines. One type of subroutine execution results from a procedure called during normal program execution whereupon the subroutine executes and at the end of the subroutine a procedure return instruction is executed to redirect program flow to the program instruction following the procedure call program instruction. The mode of operation of the processing system is typically unaltered by such procedure calls.

Exception processing subroutines (such as exception handler routines) may also be supported within a data processing system and are triggered by exceptions/interrupts arising during normal processing. These trigger execution of an exception handling subroutine. Such exception handling subroutines finish with an exception return instruction which triggers a return to an appropriate point within the original program instruction flow (which may be the instruction which gave rise to the exception, the following instruction or some other point). Associated with such exception handling routines it is known to provide a context switch which stores variables characterising the state of the system at the point at which the exception occurred and then restores these variables thereby restoring the context when the exception return instruction executes. The behavior upon execution of the exception return instruction, such as restoring context variables from a stack memory, or other context restoring operations, is different from the behavior when a procedure return instruction is executed. In order that the two different types of behavior can appropriately be invoked at the end of a subroutine it is known to provide separate return instructions respectively serving to trigger exception return processing or procedure return processing.

The consequence of this known arrangement is that it is necessary for subroutine programs to be written in a way such that the return instruction at the end is appropriate to the nature of the subroutine. For this reason, it is normal for some subroutine programs, such as exception handling subroutines, to be hand written or written in assembler such that the appropriate exception return instruction may be used to terminate the subroutine so that when executed the necessary context restore and other operations will be performed when the return is made. This requirement to hand write or write in assembly exception handling subroutines is a disadvantage since it precludes using high level computer languages, such as C, to write the entirety of exception handling code and other subroutines.

SUMMARY

Viewed from one aspect the present invention provides apparatus for performing data processing operations specified by program instructions, said apparatus comprising:

return logic responsive to a return instruction having an address as an input operand to trigger a return to execution of a program instruction indicated by said address; wherein (i) if said address has a value not matching one or more predetermined address values, then said return logic triggers a first return response comprising one or more first return response operations to yield a first returned state; and (ii) if said address has a value matching said one or more predetermined address values, then said return logic triggers a second return instruction response comprising one or more second return response operations to yield a second returned state, said one or more second return instruction response operations differing from said one or more first return instruction response operations.

The differentiation between different types of return response operation may be made within an address value which is an input operand to the return instruction. The hardware may then detect address values matching one or more predetermined address values and appropriately select the return instruction response operations to be performed in dependence upon this detection. This enables the same return instruction to be used and invoke different forms of return instruction response operations in dependence upon a data value and without any change in the instruction encoding. Thus, by arranging that instructions which require the type of return instruction response operations associated with the one or more predetermined addresses to provide such an address as an input operand to the return instruction (such as the return address for the subroutine), then the necessary return instruction response operations can be invoked.

The present technique standardises the return instruction to be used thereby enabling higher level languages to be uniformly employed in writing subroutine code and instead dedicates a small area of the memory map to be used for the one or more predetermined values which will trigger the different type of return instruction response operations when necessary. It is known within data processing systems to provide special purpose memory regions which cannot be used for normal executable code and accordingly providing such one or more predetermined values within these existing memory regions does not represent a significant compromise or restriction in the existing system designs.

Whilst the present technique could be used to differentiate between a wide variety of different return instruction responses, it is particularly useful for differentiating between procedure return responses, where an address value is loaded back into a program counter register, and exception return responses in which a return address stored within a stack memory is reloaded into the program counter register and context restored.

The one or more predetermined address values which are to be detected may also be used to effectively encode state variables of the system to be restored by the one or more second return instruction response operations. The range of predetermined address values used to trigger the second return instruction response provides additional bit space into which state variables to be restored can be encoded thereby overcoming limitations in the state variable storage mechanism and restore resources which are provided elsewhere within the system.

It will be appreciated that whilst a system may provide a single type of return instruction, which dependent upon the address associated with it may result in different return instruction responses, preferred embodiments of the present technique may provide multiple forms of return instruction which may be adapted to use the present technique whereby the return instruction response is controlled by a detection of a match between an address provided as an input operand to the return instruction concerned and one or more predetermined address values.

Viewed from another aspect the present invention provides a method of performing data processing operations specified by program instructions, said method comprising the steps of:

in response to a return instruction having an address as an input operand, triggering a return to execution of a program instruction indicated by said address; wherein (i) if said address has a value not matching one or more predetermined address values, then a first return response is triggered comprising one or more first return response operations to yield a first returned state; and (ii) if said address has a value matching said one or more predetermined address values, then a second return instruction response is triggered comprising one or more second return response operations to yield a second returned state, said one or more second return instruction response operations differing from said one or more first return instruction response operations.

The present invention may also be viewed from a complementary aspect as providing a computer program product carrying a computer program operable to control a data processing apparatus in accordance with the above described techniques.

The above, and other objects, features and advantages will be apparent from the following detailed description of illustrative embodiments which is to be read in connection with the accompanying drawings.

DETAILED DESCRIPTION

Figure 1:
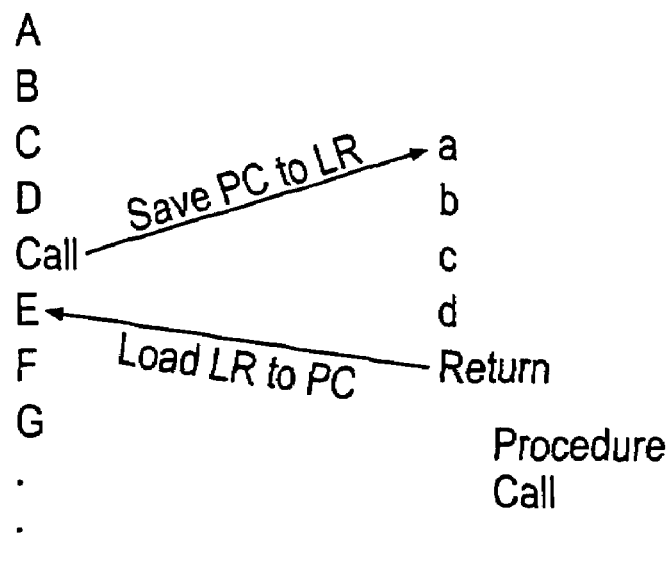
FIG. 1 schematically illustrates a procedure call subroutine.

FIG. 1 illustrates execution of a sequence of program instructions A, B, C . . . . Within these program instructions there is found a Call instruction which is a procedure call serving to redirect processing to a subroutine comprising program instructions a, b, c . . . . When this call instruction is executed the current program counter register value stored within the PC register is saved to a link register LR and the program counter register PC is loaded with the address of the first instruction within the subroutine, namely instruction a. Execution of the subroutine then proceeds until the return instruction at the end of the subroutine is encountered. At this point a return instruction response is invoked whereby the link register LR value stored is compared with one or more predetermined values and no match is detected. Accordingly, a procedure return instruction response is invoked whereby the link register LR value is loaded back into the program counter register PC (in fact the link register LR value points to the program instruction following the Call instruction) and program execution resumes at instruction E. No context switch is involved in the procedure Call of FIG. 1 and accordingly no mode switches, or register save or restore operations are necessary upon return.

Figure 2:
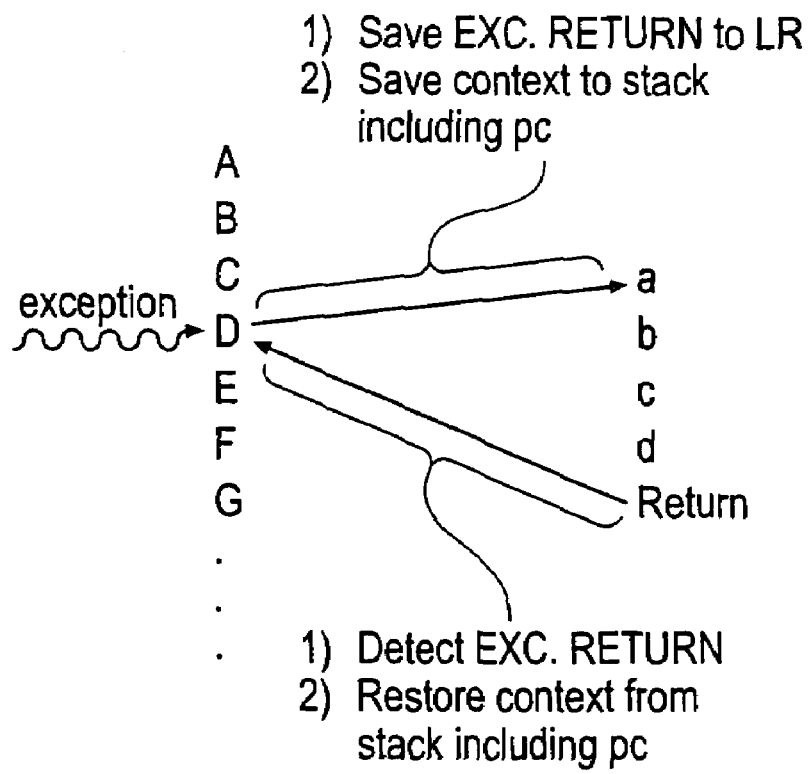
FIG. 2 schematically illustrates an exception call subroutine.

FIG. 2 schematically illustrates an exception subroutine call. The execution of the main program instructions A, B, C . . . proceeds as before but whilst instruction D is executing an exception arises. It will be appreciated that an exception can arise during execution of an instruction such that the instruction must be re-executed upon return from the exception handling routine or alternatively the following instruction should be executed. Both of these behaviors are encompassed within the present technique and may be controlled by an appropriate exception handling subroutine as necessary. Another type of exception that may arise is from an interrupt (which is typically asynchronous), whereupon an interrupt handling routine is invoked upon the next instruction boundary. If the exception illustrated in FIG. 2 were replaced by an interrupt, then the subroutine will be invoked at the interface between instruction D and instruction E. The interrupt handling routine would resume execution at instruction E.

As illustrated in FIG. 2, the behavior upon the exception subroutine call is different from that of the procedure call of FIG. 1. In particular, the hardware mechanisms involved in the exception/interrupt detection serve to force an address matching the one or more predetermined addresses (exc_return) to be stored within the link register LR. The current context of the processor is also saved in a stack memory region including the current program counter register PC value. The exception handling routine a, b, c . . . is then executed until the final return instruction is encountered. At this point the link register is read as in FIG. 1 and compared with the one or more predetermined addresses known to correspond to exception return instruction behavior. In this case there will be a match and accordingly exception return instruction response operations will be triggered including restoring the context of the processor from the values stored within the stack memory and restoring the program counter register PC value from that stored upon the stack memory rather than using the value within the link register LR which has been set by the hardware to the special exc_return value.

Figure 3:
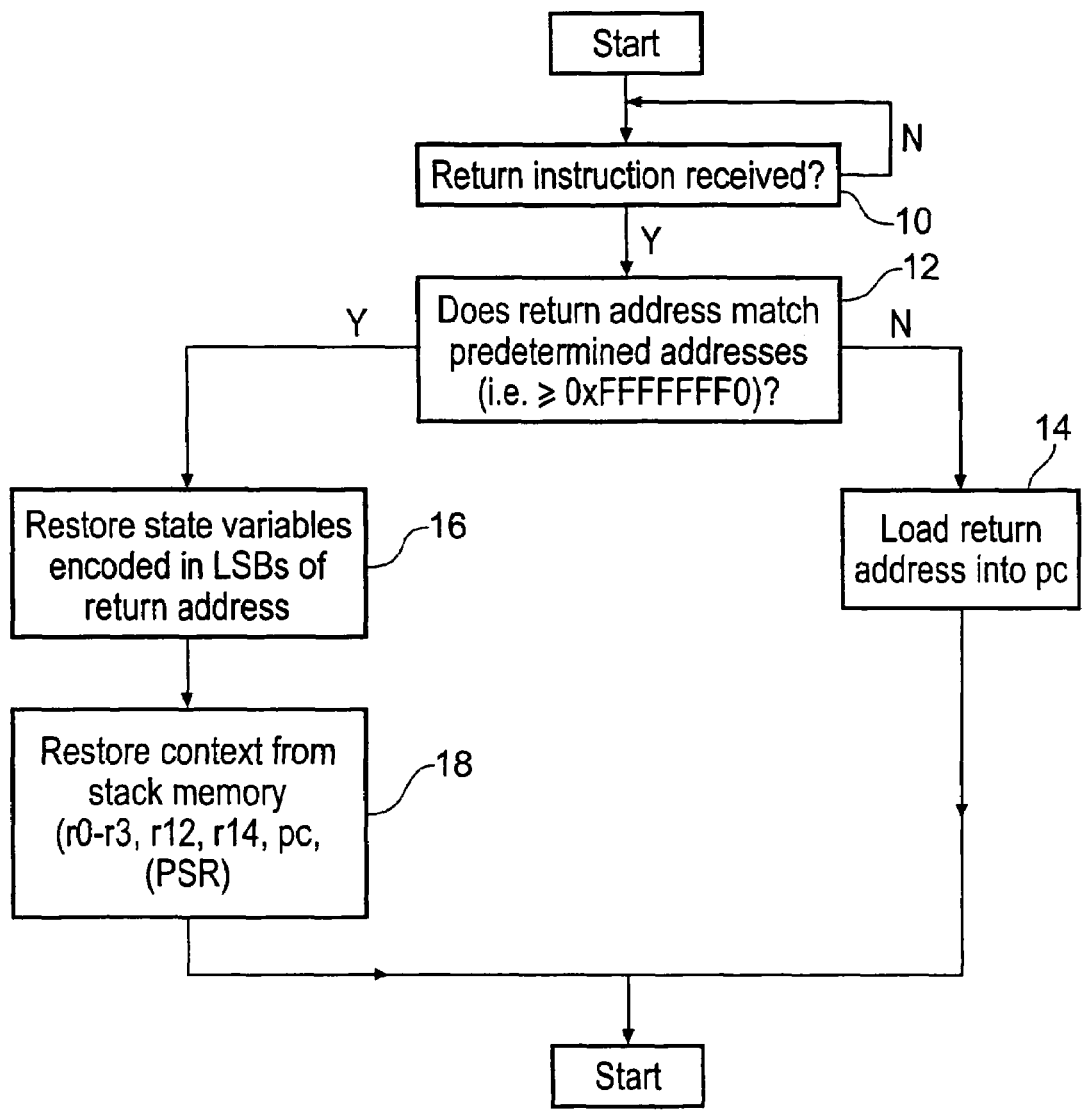
FIG. 3 is a flow diagram schematically illustrating processing performed upon receipt of return instruction.

FIG. 3 is a flow diagram schematically illustrating the behavior illustrated in FIGS. 1 and 2. At step 10, the system waits for a return instruction to be received. It will be appreciated that within a data processing system various parts of differing functional units, such as the instruction fetch unit, the instruction decode unit, the instruction execution unit, etc may all be considered to contribute part of the functionality of the return instruction logic which operates to respond appropriately to a return instruction and invoke the necessary return instruction response operations. Step 10 of FIG. 3 waits until a return instruction is received whereupon step 12 determines whether or not the return address associated with that return instruction matches one or more predetermined addresses. In this example the determination is whether or not the return address is greater than 0xFFFFFFF0.

If the determination at step 12 is that a match does not occur, then the return instruction is deemed to be a procedure call return instruction and processing proceeds to step 14 at which the return address from the link register LR is restored back to the program counter register PC.

If the determination at step 12 detected a match, then processing proceeds to step 16 at which exception call return instruction response operations are invoked including restoring one or more state variables encoded within the least significant bits of the return address itself at step 16 followed by restoring the context of the processor at step 18, including various register values stored upon a stack memory.

Figure 4:
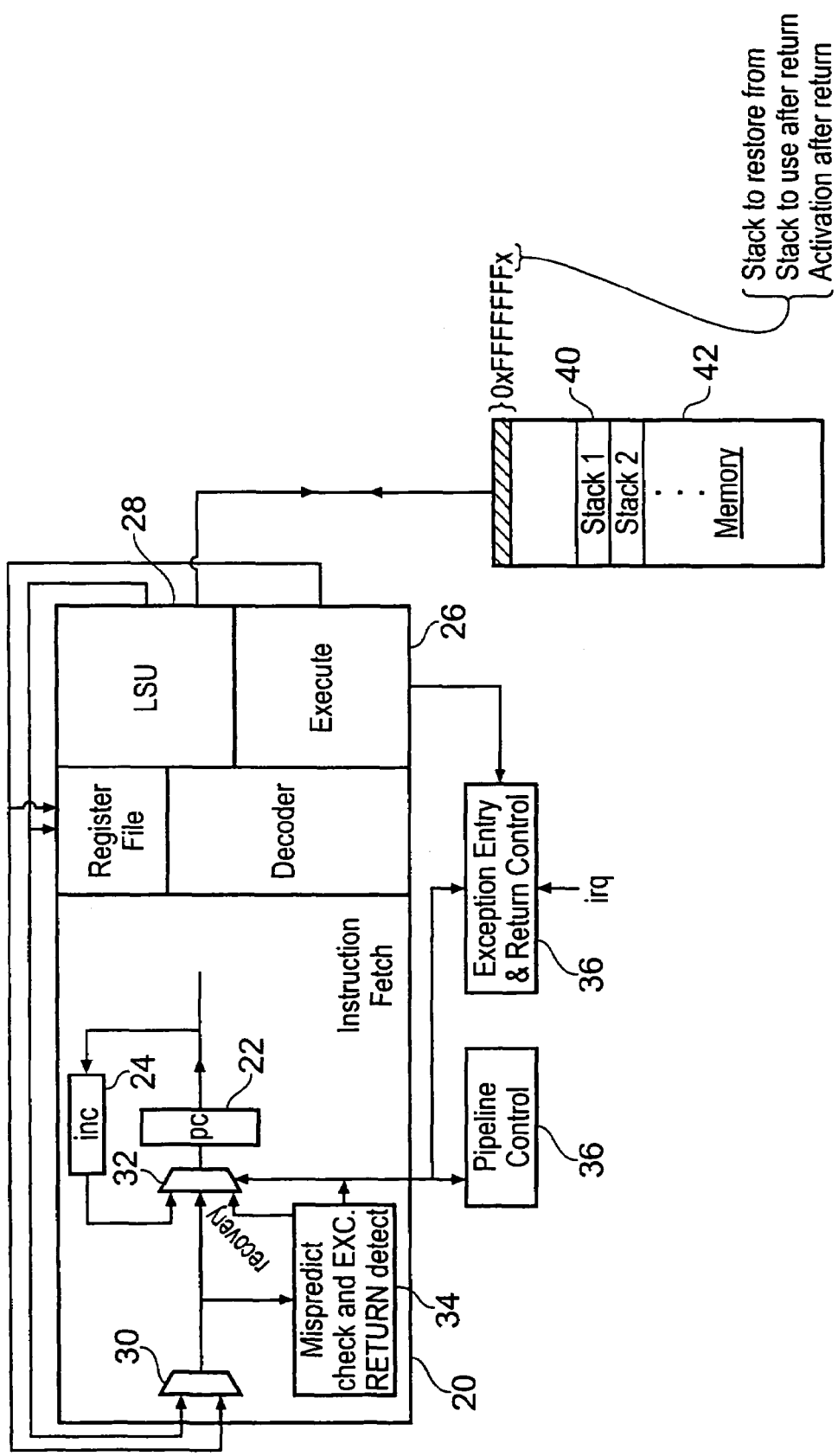
FIG. 4 schematically illustrates a data processing apparatus operating in accordance with the different type of return instruction response illustrated in FIG. 3.

FIG. 4 is a schematic representation of part of a data processing apparatus incorporating the present technique. It will be appreciated that the elements drawn are not to relative scale and that in practice many other circuit elements will be present within a full system. An instruction fetch unit 20 includes a program counter register 22 storing an address indicative of a currently executing program instruction.

Within a pipeline system it will be appreciated that there may be an offset between the program counter value stored within the instruction fetch unit 20 and the instruction actually being executed at the downstream execution stages. An incrementor 24 serves to increment this program counter value as each instruction is fetched in accordance with the normal instruction flow. If the execute unit 26 or load store unit 28 serves to execute an appropriate procedure call instruction then this will trigger a jump to a procedure subroutine by forcing an address specified by the procedure call instruction to be loaded into the program counter register 22 via the multiplexers 30 and 32.

At the end of a subroutine, a return instruction will be fetched by the instruction fetch unit 20 and proceed to be decoded and appropriately executed by the load store unit 28 or the execute unit 26. When such a return instruction is executed it will try to write a return address value to the program counter register 22 via the multiplexers 30 and 32. A return address checking circuit 34 examines the return address being written to the program counter register 22 and if this matches one or more predetermined addresses known to correspond to exception return behavior, then this will trigger an appropriate pipeline flush to be performed by the pipeline control circuit 36 and an exception return operation, including the recovery and reloading of context data from a stack memory 40 within a main memory 42 to be performed.

In this example embodiment, the one or more predetermined addresses for which a match is detected are the 16 highest addresses within the 32-bit memory space. The least significant bits of these addresses when used as the return address serve to encode state variables to be restored upon the exception return including which stack memory is to be used to restore from, which stack memory is to be used after return and an activation level of the system following the return indicative of which interrupts may or may not serve to interrupt the processing performed on the return. The exception entry and return control logic 38 is also responsive to external asynchronous interrupt signals irq to trigger exception handling routine execution as illustrated in FIG. 2. Attempted execution of undefined instructions by the execute unit 26 can also give rise to exception behavior as well as certain attempted operations by the load store unit 28 and operations elsewhere within the system. Upon entry to the exception subroutine some of the data representing the state to be restored upon execution return is encoded in the least significant bits of the return address (4-bits in this example).

Although example, illustrative embodiments have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for performing data processing operations specified by program instructions, said apparatus comprising:
    return logic responsive to a return instruction having an address as an input operand to trigger a return to execution of a program instruction indicated by said address; wherein
    (i) if said address has a value not matching any of a plurality of predetermined address values, then said return logic triggers a procedure return instruction response being a return from a procedure call and comprising one or more first return instruction response operations to yield a first returned state; and
    (ii) if said address has a value matching one of said plurality of predetermined address values, then said return logic triggers an exception return instruction response being a return from an exception call and comprising one or more second return instruction response operations to yield a second returned state, said one or more second return instruction response operations differing from said one or more first return instruction response operations;
    wherein said address when matching one of said plurality of predetermined address values includes one or more bits encoding state variables of said apparatus other than address values to be restored by said one or more second return instruction response operations.

2. Apparatus as claimed in claim 1, comprising a program counter specifying an execution point within plurality of program instructions.

3. Apparatus as claimed in claim 2, wherein said procedure return instruction response comprises loading said program counter register with said address.

4. Apparatus as claimed in claim 2, comprising stack memory logic operable to store data to a stack memory and to read data from said stack memory, wherein said exception return instruction response comprises reading a stored address from said stack memory and loading said program counter register with said stored address.

5. Apparatus as claimed in claim 1, comprising a link register operable to store said address.

6. Apparatus as claimed in claim 4, comprising exception processing logic responsive to occurrence of an exception to trigger:
    (i) storage within a link register of a value matching said one or more predetermined address values,
    (ii) storage within said stack memory of said stored address; and
    (iii) execution of an exception handling routine.

7. Apparatus as claimed in claim 1, wherein said address when matching said one or more predetermined address values includes one or more bits encoding state variables of said apparatus to be restored by said one or more second return instruction response operations.

8. Apparatus as claimed in claim 7, wherein said state variable include one or more of:
    (i) a variable controlling from which of a plurality of stack memories values should be read during said second return instruction response operation;
    (ii) a variable controlling which of a plurality of stack memories values should be used following said exception return instruction response; and
    (iii) a variable indicative of an activation level controlling a level of interrupt event permitted to interrupt current processing.

9. Apparatus as claimed in claim 1, wherein said return logic is responsive to a plurality of forms of return instruction which can each result in either said procedure return instruction response or said exception return instruction response in dependence upon a value of said address being said input operand.

10. The apparatus in claim 1, wherein said address when matching one of said plurality of predetermined address values includes one or more least significant bits encoding state variables of said apparatus other than address values to be restored by said one or more second return instruction response operations.

11. The apparatus in claim 1, wherein alignment of said predetermined address values ensures that one or more bits of said address are not relevant to the matching of said predetermined address values and said one or more bits of said address are used to contain state variables, other than address variables, to be restored by said one or more second return instruction response operations.

12. A method of performing data processing operations specified by program instructions, said method comprising:
   in response to a return instruction having an address as an input operand, triggering a return to execution of a program instruction indicated by said address; wherein
   (i) if said address has a value not matching any of a plurality of predetermined address values, then a procedure return instruction response being a return from a procedure call is triggered comprising one or more first return instruction response operations to yield a first returned state; and
   (ii) if said address has a value matching one of said plurality of predetermined address values, then an exception return instruction response being a return from an exception call is triggered comprising one or more second return instruction response operations to yield a second returned state, said one or more second return instruction response operations differing from said one or more first return instruction response operations;
   wherein said address when matching one of said plurality of predetermined address values includes one or more bits encoding state variables associated with said data processing operations other than address values to be restored by said one or more second return instruction response operations.

13. A computer program product carrying a computer program operable to control a data processing apparatus to perform a method as claimed in claim 12.

14. The method in claim 12, wherein said address when matching one of said plurality of predetermined address values includes one or more least significant bits encoding state variables associated with said data processing operations other than address values to be restored by said one or more second return instruction response operations.

15. Apparatus for performing data processing operations specified by program instructions, said apparatus comprising:
   return logic responsive to a return instruction having an address as an input operand to trigger a return to execution of a program instruction indicated by said address; wherein
   (i) if said address has a value not matching any of a plurality of predetermined address values, then said return logic triggers a first return response comprising one or more first return instruction response operations to yield a first returned state; and
   (ii) if said address has a value matching one of said plurality of predetermined address values, then said return logic triggers a second return instruction response comprising one or more second return instruction response operations to yield a second returned state, said one or more second return instruction response operations differing from said one or more first return instruction response operations,
   wherein said address when matching one of said plurality of predetermined address values includes one or more bits encoding state variables of said apparatus other than address values to be restored by said one or more second return instruction response operations.

16. The apparatus in claim 15, wherein said address when matching one of said plurality of predetermined address values includes one or more least significant bits encoding state variables of said apparatus other than address values to be restored by said one or more second return instruction response operations.

17. The apparatus in claim 15, wherein alignment of said predetermined address values ensures that one or more bits of said address are not relevant to the matching of said predetermined address values and said one or more bits of said address are used to contain state variables, other than address variables, to be restored by said one or more second return instruction response operations.

18. A method of performing data processing operations specified by program instructions, said method comprising:
   in response to a return instruction having an address as an input operand, triggering a return to execution of a program instruction indicated by said address; wherein
   (i) if said address has a value not matching any of a plurality of predetermined address values, then a first return response is triggered comprising one or more first return instruction response operations to yield a first returned state; and
   (ii) if said address has a value matching one of said plurality of predetermined address values, then a second return instruction response is triggered comprising one or more second return instruction response operations to yield a second returned state, said one or more second return instruction response operations differing from said one or more first return instruction response operations,
   wherein said address when matching one of said plurality of predetermined address values includes one or more bits encoding state variables associated with said data processing operations other than address values to be restored by said one or more second return instruction response operations.

19. The method in claim 18, wherein said address when matching one of said plurality of predetermined address values includes one or more least significant bits encoding state variables associated with said data processing operations other than address values to be restored by said one or more second return instruction response operations.

* * * * *